Figure 5:
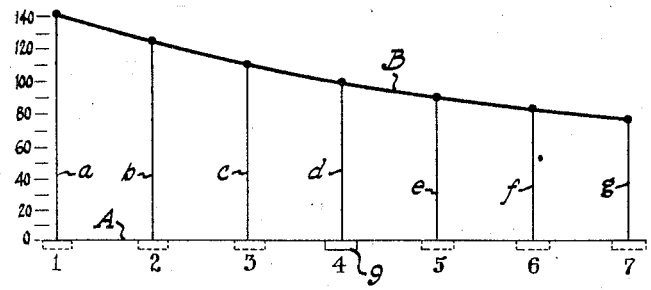

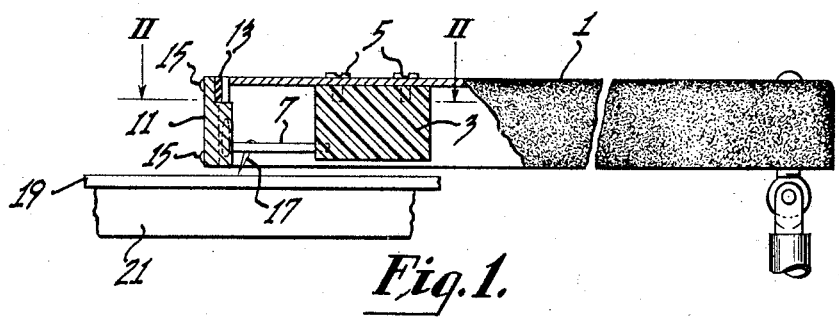
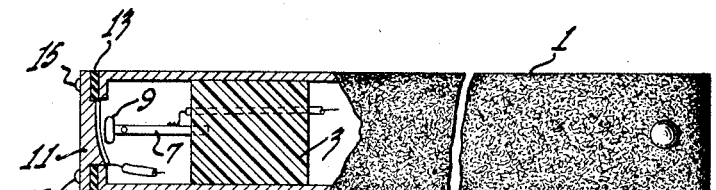
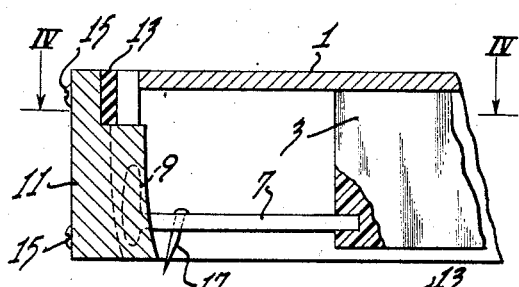
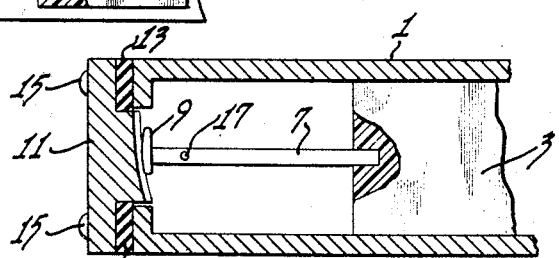
Fig. 1.
Fig. 2.
Fig. 3.
Fig. 4.
INVENTOR
Winfield R. Koch
BY
ATTORNEY Patented Jan. 27, 1948

2,435,140

UNITED STATES PATENT OFFICE 2,435,140

SIGNAL TRANSLATING APPARATUS

Winfield R. Koch, Haddonfield, N. J., assignor to Radio Corporation of America, a corporation of Delaware Application November 30, 1945, Serial No. 632,062

5 Claims. (Cl. 179—100.41)

This invention relates to signal translating apparatus, and more particularly to a phonograph pickup device of the capacity type.

Phonograph pickup devices of this type in which variations in capacity are obtained by vibratory movement of a movable plate relative to a second, stationary plate have been provided for use especially in reproducing system of the frequency modulation type. In conventional capacity-variation pickups, the capacity change is much greater when the stylus is displaced to make the air gap smaller than when it is displaced to make the air gap larger. Thus, if such a pickup is used to play a record in which the sound groove is eccentric to the axis or center of the record, the volume increases when the needle is moved in one direction and decreases when it is moved in the opposite direction. To correct this, it is possible to employ a discriminator with a complementary curve, but this adds to the cost of the system.

The primary object of my present invention is to provide an improved capacity type pickup for phonographs which will be free from the above mentioned objection.

More particularly, it is an object of my present invention to provide an improved capacity type phonograph pickup which will afford linear capacity change with stylus displacement over a wide range, thereby greatly reducing distortion and amplitude variations due to eccentricity or other similar non-uniformity of the distance of the sound groove from the center of the record.

Another object of my present invention is to provide an improved capacity type pickup device which has a wide range of response.

Still another object of my present invention is to provide an improved capacity type pickup device for phonograph records which can be used with either lateral cut records or hill and dale records.

A further object of my present invention is to provide an improved capacity type phonograph pickup device as aforesaid which will afford good tracking of the record groove by the needle and yet will result in very low record wear.

It is also an object of my present invention to provide an improved capacity type phonograph pickup device as above set forth which is simple in construction, inexpensive in cost, easy to manufacture and assemble, and highly efficient in use.

In accordance with my present invention, I provide on a suitable pickup arm a supporting block of insulating material which carries a resonant, reed-like arm on which the needle or stylus is carried. The free end of this reed-like arm is formed with a conductive member which constitutes one plate of the capacitor. Preferably, the reed-like arm should be resonant at about 15,000 cycles per second and, in order to require little force to deflect the end of this arm, it may be made of magnesium, aluminum, suitable alloys of these metals, and the like, since these require only about $\frac{1}{5}$ to $\frac{1}{3}$ the force needed for a steel arm. A further advantage of employing a lightweight arm is that the needle pressure on the record can be extremely light and still provide good tracking.

Supported in spaced relation to the previously mentioned capacitor plate is a second, stationary plate which cooperates therewith to provide the capacitor. The two plates are so arranged in relation to the reed-like arm that, when the latter is vibrated or flexed in response to forces derived by the needle from the record, the movable or vibrative plate will move across the stationary plate, rather than toward and away from it as in prior art capacity type pickups. The opposed or facing surfaces of the two plates are so shaped that when the vibratory plate moves across the stationary plate, linear capacity changes will be produced. If desired, the stationary plate may be arranged to also act as a buffer or guard so that if too much weight or pressure is placed on the pickup arm, or if the pickup is dropped onto the record, the guard will engage the record and will prevent damage to the stylus and its supporting arm.

The opposing faces of the two capacitor plates are preferably so shaped that substantially linear capacity changes will result either upon horizontal movement of the vibrative plate, as in the case of lateral cut records, or upon vertical movement thereof, as in the case of hill and dale records, thus making the pickup useful with both types of records. Where the device is rendered suitable primarily for lateral cut records, the opposed faces of the two plates may also be suitably curved in a vertical direction to compensate for vertical deflections of the vibrative plate such as result from the well known pinch effect. In any case, it is apparent that a very small air gap can be readily maintained between the capacitor plates whereby the pickup device will be very sensitive, the capacity changes in the pickup occurring at the point of maximum deflection of the reed-like arm, or the point at which the movable plate is carried thereby. The air gap can be maintained constant if the material which supports the fixed plate in position has the same temperature coefficient of expansion as that of the reed-like arm. To aid in adjusting the air gap and thereby controlling the sensitivity of the pickup, the fixed plate may be adjustably mounted on its support for adjustment relative to the movable plate. The end of the reed-like supporting arm may be made to terminate in the movable plate and the latter may be made narrow in the vertical direction where the pickup is designed for use with lateral cut records so that vertical deflection will not change the air gap appreciably. Similarly, in the case of a pickup designed for operation on hill and dale records, the movable plate may be made narrow in the horizontal direction whereby lateral or horizontal deflections thereof will not change the air gap appreciably.

Figure 6:
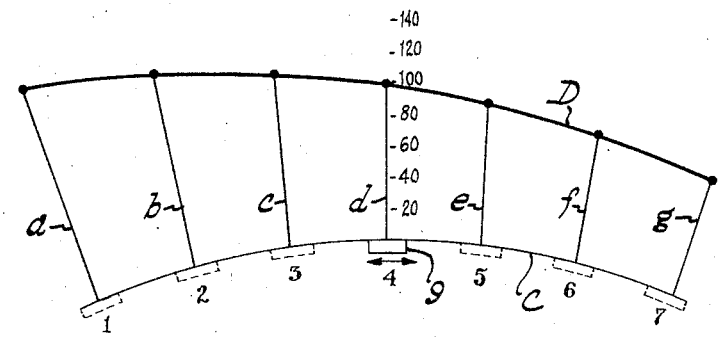

The invention, both as to its organization and method of operation, as well as additional objects and advantages thereof, will better be understood from the following description of one embodiment thereof when read in connection with the accompanying drawing in which Figure 1 is a side elevation, partly in section, of one form of pickup device according to my present invention, Figure 2 is a sectional view thereof on the line II—II of Figure 1, Figure 3 is an enlarged, fragmentary, sectional view of the pickup head shown in Figure 1, Figure 4 is a sectional view thereof taken approximately on the line IV—IV of Figure 3, and Figures 5 and 6 are graphs illustrating the manner of determining the shapes of the capacitor plates in accordance with the present invention.

Referring more particularly to the drawing, wherein similar reference characters designate corresponding parts throughout, there is shown a pickup arm 1 to which is secured a block 3 of insulating material by means of screws 5 or the like. The block 3 carries adjacent its lower end a forwardly extending, resilient, reed-like arm 7 which terminates at its forward end in a conductive plate 9 constituting one plate of the capacitor. The reed 7 and the plate 9 may be made of one piece, if desired, preferably of some light weight metal, such as aluminum, magnesium, or alloys of these metals. The pickup arm 1 extends forwardly beyond the supporting block 3 to a point in advance of the plate 9 and supports, at its forward end, a second, conductive plate 11 in spaced relation to the plate 9. The plate 11 is stationary and the plate 9, which moves relative to the plate 11 when the reed 7 is flexed, constitutes the vibrative plate, the latter being arranged to move across the stationary plate 11.

In order to produce changes in capacity upon movement of the plate 9 with respect to the plate 11, the opposed faces of the two plates are formed on different curves such that, as the plate 9 moves, the air gap between the two plates will be varied. Preferably, the opposed faces or surfaces of the plates 9 and 11 are so shaped, as more fully described hereinafter, that the changes in capacity will be substantially linear. That is to say, the opposed faces of the plates 9 and 11 have such shape that, regardless of whether the plate moves in either direction horizontally when operating on a lateral cut record or in either direction vertically when operating on a hill and dale record, substantially the same degree of capacity change will result for a given movement of the plate 9. Preferably, also, there is interposed between the stationary plate 11 and the end of the pickup arm 1 a pair of strips 13 of soft rubber or other yieldable material which may be more or less compressed by turning in one direction or the other a plurality of mounting screws 15 which hold the stationary plate 11 on the arm 1. This permits adjustment of the stationary plate 11 relative to the movable plate 9 to adjust the air gap and thereby control the sensitivity of the pickup.

The opposed, facing surfaces of the plates 9 and 11 are preferably curved both in the horizontal and vertical directions so that the pickup will be equally useful with records of either the lateral cut type or the hill and dale type. The reed 7 is preferably made of a material which is quite rigid torsionally but which is flexible in both horizontal and vertical directions. By making the reed 7 of a material which has the same temperature coefficient expansion as the material of the pickup arm 1, variations in temperature will not affect the width of the air gap between the plates 9 and 11. If the pickup is designed primarily for use with lateral cut records, the reed 7 may be made more flexible horizontally than vertically and the movable conductive plate 9 may be made fairly narrow in the vertical direction. Thus, distortion resulting from the pinch effect will be negligible. Furthermore, by suitably curving the opposing faces of the plates 9 and 11 in a vertical direction, the distortion may be further reduced, if not almost entirely eliminated. On the other hand, if the pickup device is designed primarily for use with hill and dale records, the reed may be made more flexible vertically than horizontally and the movable plate 9 can be made narrow in the horizontal direction to minimize distortion resulting from the lateral movement of the plate 9.

The precise shapes of the opposed faces of the capacitor plates 9 and 11 will vary according to conditions. By way of illustration, the following description will show how these shapes may be determined, reference being had particularly to Figures 5 and 6:

Let it be assumed, first, that the free end of the reed 7 (that is, the plate 9) moves back and forth along a straight line A (Figure 5) instead of in a curved path. For very small deflections of the reed 7, this is a very close approximation. Let it be assumed, further, that the capacity between the plates 9 and 11 varies inversely as the length of the gap therebetween. Fringing of the flux modifies the capacity change for large variations in the size of the gap, but for small variations in the gap size, the second assumption is entirely justifiable. As a hypothetical example, let it be assumed, further, that the air gap between the capacitor plates is to be designed for a ±30% capacity change. In such case, for seven different positions of the vibrative plate 9, the relation between the capacity and the size of the gap in each of these positions will be as shown in the following table:

| | Position of Plate 9 | Capacity | Gap Size |
|---|---|---|---|
| | | Per cent | Per cent |
| (1) | 3 units left of center | 70 | 141 |
| (2) | 2 units left of center | 80 | 125 |
| (3) | 1 unit left of center | 90 | 111 |
| (4) | Center | 100 | 100 |
| (5) | 1 unit right of center | 110 | 91 |
| (6) | 2 units right of center | 120 | 83 |
| (7) | 3 units right of center | 130 | 77 |

By plotting the various positions of the plate 9 against the gap dimensions as shown by the foregoing table, the curve B of Figure 5 will be obtained. This curve shows the shape which the plate 11 would have under the conditions assumed above.

Actually, the plate 9 does not move along a straight line but swings substantially along a parabolic path, provided the reed 7 has the same cross section at all points. This means that the straight line path A of the plate 9 shown in Figure 5 must be replaced by a curve which is, for all practical purposes, a parabola, as shown by the curve C of Figure 6. Now, if the ordinates $a, b, c, d, e, f, g$ of Figure 5 (which are the distances between the curve B and the assumed straight line path A of the vibrative plate 9 at the various positions thereof shown in the above table) are measured, and the lengths of these ordinates are laid off at corresponding points from the curve C of Figure 6, a curve D can be drawn through the upper ends of these ordinates which will represent the contour which the stationary plate 11 should have in accordance with the present invention. The gaps represented by the distances $a, b, c, d, e, f, g$ in Figure 6 should be measured normal to the curve C, but in actual practice, these will be found to be nearly the same as if they were measured parallel to the center position, No. 4, of the plate 9.

The foregoing analysis is equally applicable for movement of the reed in a vertical instead of a horizontal direction, and the same procedure may be followed in determining the curvature of the stationary plate 11 in both horizontal and vertical directions. The precise shape of the surface of the vibrative plate 9 which faces the stationary plate 11 is not critical due to the small dimensions of the plate 9. In general, however, it may be stated that it should preferably be formed on a curve which has approximately the average curvature of the curve D.

With modifying factors, the actual shape of the curve D may vary from the hypothetical, somewhat parabolic curve shown in Figure 6. For example, fringing of the field, non-uniformity of the cross section in the reed 7, etc., will influence the precise shape of the curve D, as will be obvious to one skilled in the art, and proper compensation may therefore be made for such factors. Obviously, in the vertical direction, the plate 11 should also be substantially parabolic to keep the gap and therefore the capacity changes constant for equal vertical deflections of the movable plate 9. The focus of the parabolic path along which the movable plate 9 moves, whether horizontally or vertically, occurs at about 39% of the length of the reed 7 from the front surface of the plate 9, that is, the surface thereof which faces the plate 11.

In order to effect vibration of the reed 7 and its plate 9, the reed may be provided with a suitable needle 17 which is adapted to cooperate with a record 19 on a turntable 21. The needle 17 and the reed 7 may be of the type shown in Hasbrouck Patent No. 2,326,460, for example, or of any other suitable type. The needle 17 extends down below the fixed plate 11 a short distance sufficient to enable the pickup arm and the plate 11 to clear the record. By terminating the lower end of the plate 11 close to the tip of the needle 17, the plate 11 can act as a guard or buffer which will engage the record to prevent damage to the needle 17 and the reed 7 should an excessive force be applied to the pickup head, or should the pickup arm be dropped accidentally on the record.

From the foregoing description, it will be apparent to those skilled in the art that I have provided a novel, capacity type phonograph pickup which will provide linear capacity changes and which will result in improved record reproduction. Although I have shown and described but a single embodiment of my invention, it will undoubtedly be apparent to those skilled in the art that various other modifications thereof are possible, and it should be understood that the modification described above is merely for the purpose of illustration.

I claim as my invention:

1. A phonograph pickup device of the capacity type comprising a support, a resilient arm extending from said support and terminating in a first conductive member, said arm constituting a vibratory mounting for said first conductive member, means having the same temperature coefficient of expansion as said arm extending from said support to a point beyond said first conductive member, and a second conductive member stationarily supported by said means beyond and in spaced relation to said first conductive member, said conductive members facing each other and cooperating to provide a capacitor.

2. A phonograph pickup device of the capacity type comprising a support, a resilient arm extending from said support and terminating in a first conductive member, said arm constituting a vibratory mounting for said first conductive member, means having the same temperature coefficient of expansion as said arm extending from said support to a point beyond said first conductive member, and a second conductive member stationarily supported by said means beyond and in spaced relation to said first conductive member, said conductive members facing each other and cooperating to provide a capacitor, and said arm being arranged to carry said first conductive member across said second conductive member upon flexure thereof.

3. A phonograph pickup device according to claim 2 characterized in that the opposed faces of said conductive members are so shaped that the capacitance of said capacitor will vary substantially linearly upon movement of said first conductive member across said second conductive member.

4. A phonograph pickup device according to claim 2 characterized by the addition of a needle carried by said arm for cooperation with a phonograph record groove whereby to derive forces for flexing said arm.

5. A phonograph pickup device according to claim 2 characterized in that said second conductive member is adjustably carried by said means for adjustment bodily toward and away from said first conductive member whereby to vary the spacing therebetween, and characterized further by the addition of means for holding said second member in adjusted position on said first named means.

WINFIELD R. KOCH.

REFERENCES CITED

The following references are of record in the file of this patent:

UNITED STATES PATENTS

| Number | Name | Date |
|---|---|---|
| 1,777,397 | Crozier | Oct. 7, 1930 |
| 2,274,638 | Rosene | Mar. 3, 1942 |